(12) United States Patent
Cigelske, Jr. et al.

(10) Patent No.: US 7,375,305 B2
(45) Date of Patent: May 20, 2008

(54) SYSTEM FOR ASSEMBLING WELDING APPARATUS

(75) Inventors: James J. Cigelske, Jr., Menasha, WI (US); Richard M. Achtner, Neenah, WI (US)

(73) Assignee: Illinois Tool Works Inc., Glenview, IL (US)

( * ) Notice: Subject to any disclaimer, the term of this patent is extended or adjusted under 35 U.S.C. 154(b) by 901 days.

(21) Appl. No.: 10/065,571

(22) Filed: Oct. 31, 2002

(65) Prior Publication Data

US 2004/0084428 A1 May 6, 2004

(51) Int. Cl.
*B23K 9/10* (2006.01)
(52) U.S. Cl. .................................... 219/130.1; 219/136
(58) Field of Classification Search ............. 219/130.1, 219/136; 174/50, 53, 61, 65 R; 361/679, 361/726, 732
See application file for complete search history.

(56) References Cited

U.S. PATENT DOCUMENTS

| 4,166,195 | A | * | 8/1979 | Schwab | 174/95 |
|---|---|---|---|---|---|
| 4,368,563 | A | * | 1/1983 | Lentz | 24/637 |
| 4,451,693 | A | | 5/1984 | Vest | |
| 4,903,377 | A | * | 2/1990 | Doty | 24/194 |
| 5,700,165 | A | | 12/1997 | Harris et al. | |
| 5,795,193 | A | | 8/1998 | Yang | |
| 5,831,240 | A | * | 11/1998 | Katooka et al. | 219/130.1 |
| 6,489,591 | B1 | * | 12/2002 | Achtner | 219/130.1 |

* cited by examiner

*Primary Examiner*—Kevin P Kerns
(74) *Attorney, Agent, or Firm*—Ziolkowski Patent Solutions Group, SC

(57) ABSTRACT

A welding apparatus having a system to facilitate its assembly. The apparatus is assembled by affixing a pair of molded end panels to a molded base and each of the end panels has a specially constructed receptacle area that is adapted to receive an end of the base. Each end of the base has a pair of snaps that extend outwardly and which engage with a correspondingly located pair of ramps formed in the receptacle area of each of the end panels. Thus the assembly is easily carried out by simply inserting the base ends into the receptacle areas where the snaps ride up the ramps and engage the vertical walls on the inner side of those ramps to securely affix the end panels to the base. Preferably the snaps are U-shaped in configuration with the distal end of the snaps being the closed ends of the U-shaped snaps.

5 Claims, 4 Drawing Sheets

SYSTEM FOR ASSEMBLING WELDING APPARATUS

BACKGROUND OF INVENTION

The present invention relates generally to a welding apparatus and, more particularly, to a system to facilitate the assembly of a welding apparatus.

In the construction and assembly of various types of apparatus, the actual assembly of the apparatus is an important factor in the overall cost of the production of the apparatus and, therefore, it is of paramount importance that the cost of assembly procedures and assembly steps be kept to a minimum while still, obviously, providing a quality apparatus that is robust and therefore desirable to the customer.

As such, it is therefore important to facilitate the assembly process of such apparatus to simplify the individual steps that are required by the assembler in the assembly line in order to make those assembly steps as easy to carry out as possible, within the aforementioned guidelines, so as to reduce the cost of manufacturing the apparatus. Since the time that it takes to carry out any particular step in the assembly process is also costly, it is, therefore, of importance to make the assembly of an apparatus require a minimum of manipulations by the assembler and preferably without the use of hand tools or separate fasteners or hardware that is needed to affix a component to the apparatus.

In the case of welding apparatus, there are certain major structural components, and among those are an enclosure that is generally constructed of a metal material such as aluminum and which contains and houses the various components necessary for the overall operation of the welding apparatus. Other structural components include a pair of end panels that are affixed to the ends of the enclosure in order to enclose the interior of the enclosure to contain those components and, therefore, there is a front panel and a rear panel, both of which are generally constructed of a molded plastic material. There is also a base, again generally comprised of a molded plastic material.

In the assembly of the welding apparatus, it is therefore a necessary step to join the molded base to the front and rear panels and the joining together needs to be a strong affixation since that subassembly thereafter can pass on to other stages of the assembly process and must have sufficient integrity to allow the assembler to handle that subassembly without it coming apart and holding up the further assembly. Thus, it is necessary to have a rapid, easy method of assembling, for example, the rear panel to the base that can be readily accomplished by the assembler but which results in a subassembly that is unlikely to inadvertently become detached during the later assembly procedures of the apparatus.

It would also be advantageous for the assembly of a base to a end panel of a welding apparatus, be it the rear panel or the front panel, to minimize, to the extent possible, the number of extraneous parts, such as added hardware, including screws, gaskets, nuts and the like in the assembly process and therefore any steps to better facilitate such assembly would be advantageous in reducing the cost of such manufacture.

Therefore, it would be advantageous to have a simple means of assembling the front and rear panels to the base of the welding apparatus that provides a strong affixation while minimizing the time and manipulations by an assembler necessary to carry out that assembly.

BRIEF DESCRIPTION OF INVENTION

The present invention is directed to an improved mounting means to facilitate the assembly of a certain structural components in the construction of a welding apparatus.

In the preferred embodiment, and as will be specifically described herein, the welding apparatus itself is comprised of a metal enclosure that houses the various components that are utilized in providing a variable power supply to carry out the welding process. The enclosure has a pair of end panels, that is, there is a front panel and a rear panel which are affixed to the enclosure as well as a base to contain those components therein. The front and rear plastic panels and base are all preferable constructed of a molded plastic material.

A mounting system is incorporated into the front and rear panels as well as the base of the welding apparatus to facility the affixing together of the front and rear panels to the base that enables the quick and easy assembly of those components during the assembly line production of the apparatus.

To that end, the front and rear panels are molded so as have a receptacle area located at the lower area of panels that is configured to receive an end of the base where the base is interfitted into that receptacle area and which has certain features to assure the good interfitting as well as to strengthen that affixation.

One of such features is that the lateral interior surfaces of the receptacle area of the panel are contoured to closely fit around a complementary configured lateral exterior sides of the end of the base that interfits into the receptacle area. The fitting of the end of the base into the receptacle area therefore results in a snug fit with adjacent lateral external sides of the end of the base and the lateral internal surfaces of the receptacle area being aligned in close proximity to each other so as to add stability to the affixation of the base to a panel.

In addition, the receptacle area of the end panel can have one or more ribs molded therein that are generally vertically oriented and which fit against and abut the upper surface of the end of the base when interfitted into the receptacle area of a panel so that the vertical movement of the base is constrained and the end of the base is automatically aligned as it is inserted into the receptacle area of a panel.

There is also a securing system that facilitates the affixation of the base to the front and rear panels. Each end of the base has plurality of snaps, preferably U-shaped, that are molded into the plastic material of the base and which have the closed ends of the U-shaped snaps extending outwardly from each of the ends of the base to which the front and rear panels are to be affixed in assembling the welding apparatus.

Within the receptacle area of each panel, there are a plurality of ramps, preferable a pair of ramps, that are in alignment with the snaps formed in the end of a base when the base and panel are being assembled together. Each ramp has a upwardly angled upper surface that ascends in the direction away from the base to be assembled and there is a recess that follows the uppermost end of that inclined ramp surface thereby forming a generally rear vertical wall of the ramp. Thus, in carrying out that assembly, as the end of the base is inserted into receptacle area of each panel, the snaps rides upwardly along the ramps and those snaps further ride over the upper ends of the ramps such that the distal ends of the snaps lock against the vertical rear walls of the ramps, thereby locking the base and the panel together in a tool-free, easy procedure that can be readily carried out in the assembly of a welding apparatus.

As a further feature, an access opening is provided in the end panel that allows access to the distal end of each of the snaps when they are in their locked position to enable a tool to be inserted into the opening to make contact with the distal ends of the snaps such that the distal ends can be raised vertically to clear the ramps and thus unlock the snaps from their locked position to an unlocked position where the base and the panel can be detached from each other. Thus, the locking of the base and end panel can readily be unlocked as desired to separate those components.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings.

DETAILED DESCRIPTION

Figure 1:
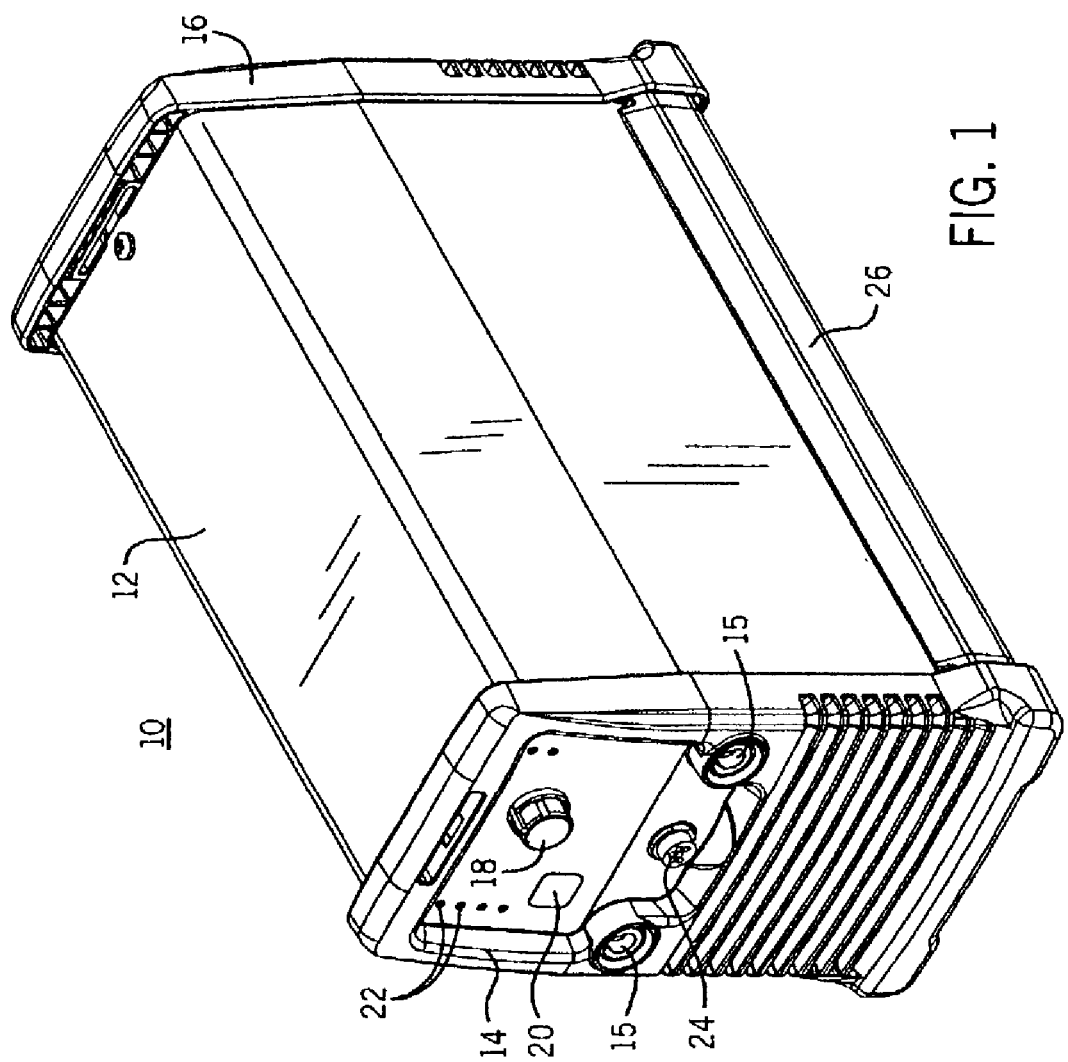
FIG. 1 is a perspective view of a welding apparatus for which the present invention is applicable.

Referring now to FIG. 1, there is shown a welding apparatus 10 that utilizes the present invention. As can be seen, the welding apparatus 10 comprises an enclosure 12 that is a sheet metal construction, preferable of aluminum and having a front panel 14 and a rear panel 16. Both the front and rear panels 14, 16 are preferably constructed of a molded plastic material. The front panel 14 has a central control section and which includes the various controls for the welding functions and can include female connectors 15 that are used to connect the welding cables.

A control knob 18 is provided in order to control the current to the welding electrodes and a selector button 20 is provided to enable the welding apparatus to be switched between TIG and stick operation. There may also be a series of LED's 22 to provide an indication of status of the welding apparatus and to provide information as to its operation. A remote connector plug 24 is also used for the operation of remote controls such as a foot operated switch for the welding apparatus 10.

A base 26 is located underneath the enclosure 12 and can also be a molded plastic construction and, as can be seen, the base 26 can be actually elevated with respect to the floor such that the welding apparatus 10 contacts the floor through the front and rear panels 14, 16.

Figure 2:
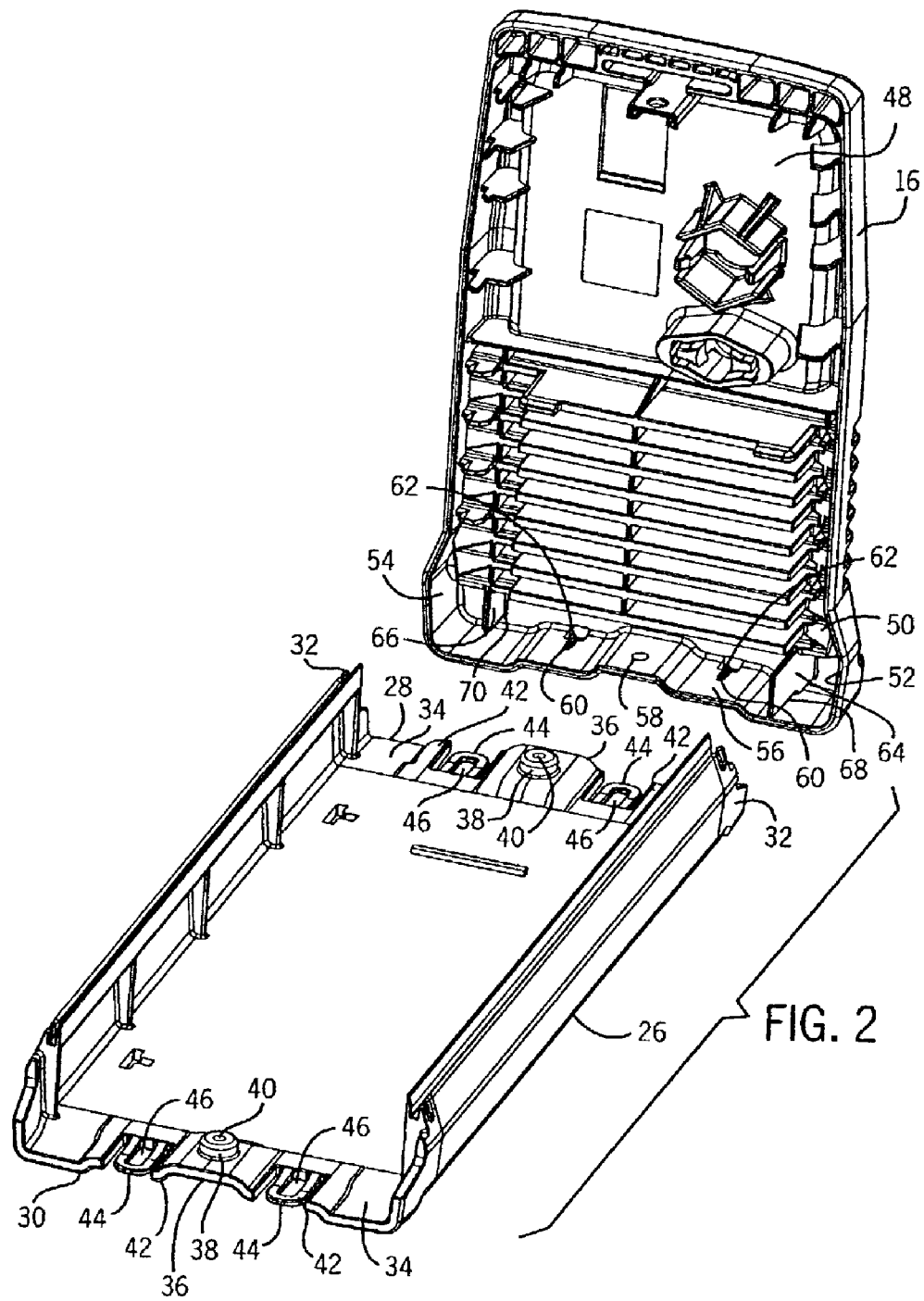
FIG. 2 is an exploded view of the base and rear panel of the present invention illustrating the assembly of those components.

Turning now to FIG. 2, taken along with FIG. 1, there is shown an exploded view of the base 26 that is in position to be affixed by means of the present invention to the rear panel 16 for illustrative purposes, it being seen that to the front panel 14 and the rear panel 16 are both preferable affixed to the base 26 by means of the same inventive system. The front panel 14 and the rear panel 16 are sometimes hereinafter generically referred to as end panels.

Taking first the description of the base 26, the base 26 has opposite ends 28, 30 that are recessed slightly downwardly and the end 28 is therefore interfitted into the rear panel 16 as will be explained. The base 26 also has external lateral sides 32 that are formed in the configuration of a shallow triangular shape, that is, the external lateral sides 32 are slightly angled or bowed outwardly.

Since both ends 28, 30 are the same, like numbers will be used to describe the ends 28, 30. As such, the ends 28, 30 have an upper surface 34 and a center portion 36 that bows slightly upwardly and has a boss 38 with a threaded hole 40 formed therein. A pair of snaps 42 extend outwardly from each of the ends 28, 30 and the snaps 42 are preferable molded into the molded plastic material of the base 26. The snaps 42 each have a distal end 44 and an elongated hole 46 formed therein. In the preferred embodiment as shown in FIG. 2, the snaps 42 are U-shaped in configuration and therefore the distal ends 44 are the closed ends of that U-shape configuration.

Next, taking the rear panel 16, that rear panel 16 is also preferably of a molded plastic construction and includes an inner surface 48 that faces the base 16 and which encloses the components of the welding apparatus when the rear panel 16 is affixed to the enclosure 12. At the lower portion of the rear panel 16, there is a receptacle area 50 that is formed therein and which is basically bounded by oppositely disposed internal lateral surfaces 52, 54 and a lower surface 56. As can be seen, the lower surface 56 generally follows the contour of the end 28 of the base 26 such that, when the base 26 is affixed to the rear panel 16, the end 28 of the base 26 sits atop the lower surface 56 in close proximity therewith.

Also formed in the lower surface 56 of the receptacle area 50 is a hole 58 through which a screw can be inserted and threaded into the threaded hole 40 to finalize the affixing of the rear panel 16 to the base 26. The are also a pair of ramps 60 formed in the molded plastic lower surface 56 and recesses 62 formed behind the ramps 60 in the orientation of the FIG. 2, and the ramps 60 and the recesses 62 will be later explained.

There are also a pair of vertically aligned ribs 64 and 66 extending outwardly from the inner surface 48 of the rear panel 16 and having lower edges 68, 70 respectively, that are spaced a predetermined distance above the lower surface 56 of the receptacle area 50 thereby leaving an opening between the lower edges 68, 70 and the lower surface 56. Therefore, that predetermined distance is dimensioned such that the lower edges 68, 70 of the ribs 64, 66 abut against the upper surface 34 of the end 28 when the end 28 is interfitted into the receptacle area 50 in joining the base 26 to the rear panel 16. That abutting relationship stabilizes the base 26 to the rear panel 16 by constraining the vertical movement between the base 26 and the rear panel 16 as well as aligns the base 26 with respect to the rear panel 16 in order to also align the snaps 42 with the ramps 60.

Figure 3:
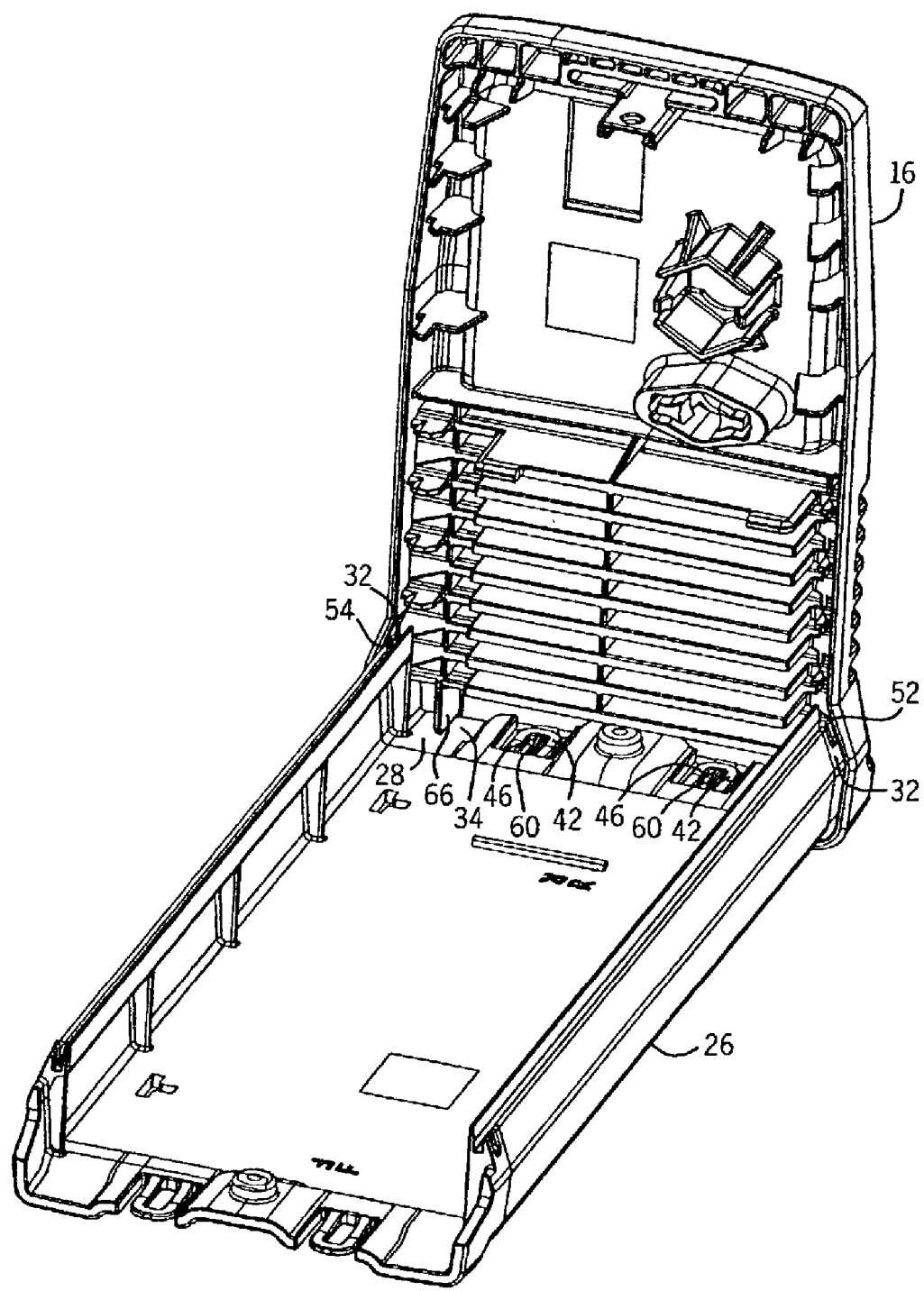
FIG. 3 is a perspective view of the base and rear panel affixed together.

Turning now to FIG. 3, there is shown a perspective view wherein the base 26 has been affixed to the rear panel 16, thereby forming a subassembly for the later further assembly of the welding apparatus 10 (FIG. 1). In FIG. 3, it can be seen that that the lateral internal surfaces 52, 54 within the receptacle area 50 closely surround the lateral external sides 32 of the base 26 in close proximity thereto such that the end 28 of the base 26 is nested within the receptacle area 50 and that the base 26 is supported against side to side motion while, at the same time, rib 66 rests against the upper surface 34 of the end 28 to resist vertical movement between the base 26 and the rear panel 16 and further to guide the snaps 42 into their position atop of the ramps 60. As seen, the ramps 60 extend upwardly through elongated holes 46 in the snaps 42 to hold the base 26 in its position firmly to the rear panel 16.

Figure 4:
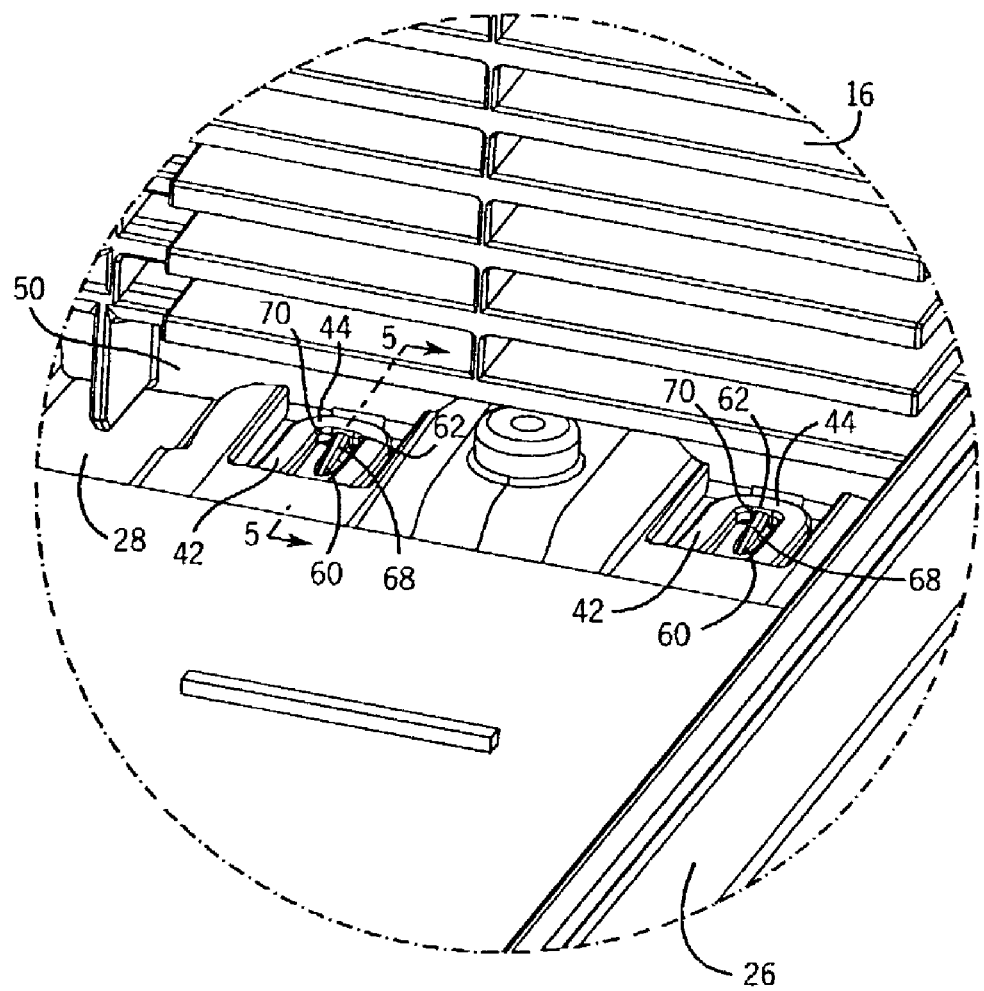
FIG. 4 is an enlarged perspective view showing the snaps of the base affixed to the rear panel.

Turning to the enlarged perspective view in FIG. 4, there is best shown the relationship between the base 26 as it is in its affixed position to the rear panel 16. As can be seen, the snaps 42 basically encircle the ramps 60 and the distal end 44 of the snaps 42 are positioned in a locked position behind the snaps 42 to prevent the base 26 from becoming detached from the rear panel 16. As seen in FIG. 4, the ramps 60 have an upwardly inclined top surface 68 and a vertical rear wall 70 and the distal end 44 of the snaps 42 becomes locked in position behind the vertical rear wall 70 to retain the base 26 in the locked position to the rear panel 16.

Accordingly, in the affixation of the base 26 and the rear panel 16, the end 28 is inserted into the receptacle area 50 such that the snaps 42 slide up along the inclined top surface 68 of the ramps 60 and eventually pass beyond the inclined top surface 68 and drop down into the recesses 62 to become locked in position against the vertical rear wall 70 of the ramps 60.

Figure 5:
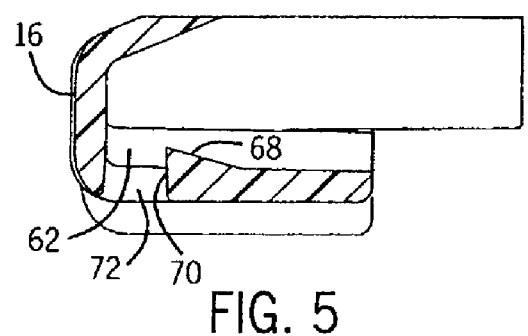
FIG. 5 is side cross-section view of a lower portion of the rear panel taken along the line 5-5 of FIG. 4 and showing a ramp formed on the rear panel.

Turning now to FIG. 5, taken along with FIG. 4, there is shown a cross sectional view of a ramp 60 taken along the line 5-5 of FIG. 4. Thus the inclined top surface 68 slopes upwardly in the direction away from the base 26 and terminates at the vertical rear wall 70 where the distal end 44 of the snap 42 becomes held in the locked position within the recess 62. As also can be seen, there is an access opening 72 formed in the rear panel 16 that allows access to the distal end 44 of the snap 42.

By means of the access opening 72, a tool can be inserted through the access opening 72 to contact and push the distal end 44 of the snap 42 upwardly to the point it can clear the vertical rear wall 70 of the ramp so that the snap 42 can be unlocked and the base 26 detached from the rear panel 16. Thus, even when the snaps 42 have been locked into position, the locking system of the invention can be unlocked through the access opening 72 to disassemble the base 26 from the rear panel 16.

The present invention has been described in terms of the preferred embodiment, and it is recognized that equivalents, alternatives, and modifications, aside from those expressly stated, are possible and within the scope of the appending claims.

What is claimed is:

1. A method of assembling an end panel to the base of a welding apparatus, the method comprising the steps of:
   providing a molded base with at least one snap having a distal end and an elongated opening formed therein, the at least one snap extending outwardly therefrom, providing a molded plastic panel having at least one inclined ramp formed thereon leading to a vertical rear wall and having a recess formed proximate the rear wall,
   inserting the molded base into the molded plastic panel to cause the snap to ride upwardly along the inclined ramp and enter into the recess to lock the distal end of the at least one snap against the rear wall of the at least one ramp to retain the base to the end panel.

2. The method as defined in claim 1 wherein the step of providing a molded base with at least one snap comprises providing a molded base with a pair of U-shaped snaps.

3. The method as defined in claim 1 wherein the molded plastic panel has an access opening proximate the rear wall of the ramp and the method further comprises the step of inserting a tool through the access opening to move the distal end of the snap vertically upwardly to unlock the snap from the rear wall of the ramp.

4. The method as defined in claim 1 wherein the step of providing at least one snap comprises providing a pair of snaps and the step of providing at least one ramp comprised providing a pair of ramps.

5. The method as defined in claim 1 wherein the step of inserting the molded base further comprises deflecting the snap along the inclined ramp during insertion.

* * * * *